Oct. 5, 1971  TAMAKI TOMITA  3,610,105
POWER STEERING APPARATUS
Filed April 22, 1969  6 Sheets-Sheet 1

United States Patent Office 3,610,105
Patented Oct. 5, 1971

3,610,105
POWER STEERING APPARATUS
Tamaki Tomita, Asahi-machi, Kariya, Aichi, Japan, assignor to Toyoda Koki Kabushiki Kaisha (trading as Toyoda Machine Works, Ltd.)
Filed Apr. 22, 1969, Ser. No. 818,209
Claims priority, application Japan, Apr. 28, 1968, 43/28,083
Int. Cl. F01b 3/02, 13/04; F15b 9/10
U.S. Cl. 91—503     6 Claims

ABSTRACT OF THE DISCLOSURE

The present invention relates to power steering apparatus in which the operation of a spool valve is rendered easy by preventing the steering force or the reaction thereto from acting on the spool valve. In this apparatus the spool valve is screwed onto a steering shaft connected to the steering wheel; the rotating shaft for deflecting the steerable front wheels is connected to the steering shaft by resilient coupling means; the hydraulic pressure circuit is controlled by the displacement of the spool valve; and the steering torque is boosted by hydraulic pressure.

SUMMARY OF THE INVENTION

The present invention relates to power steering apparatus and more particularly to power steering apparatus comprising a hydraulic motor and servo valve means wherein a spool valve is axially moved by manual steering to control pressure fluid for operating the hydraulic motor.

A primary object of the present invention is to provide power steering apparatus which may be operated reliably and smoothly without any abruptness of response.

Another object of the present invention is to provide power steering apparatus which will respond to very small movements of the steering wheel.

A further object of the present invention is to provide power steering apparatus comprising a servo valve in which the pressure fluid is controlled by a spool valve which does not transmit steering torque.

Yet an other object of the present invention is to provide power steering apparatus which is adapted to make a vehicle driver feel a steering reaction proportional to the deflection or steering angle of a steering wheel.

Still another object of the present invention is to provide power steering apparatus which is simple in construction and inexpensive and easy to manufacture.

An additional object of the present invention is to provide power steering apparatus including servo valve means which is not affected by deflecting forces encountered by the steerable wheels of a vehicle.

The present invention is also intended to provide power steering apparatus utilizing a rotary hydraulic motor to make it compact in size and to obtain high mechanical efficiency.

Yet another object of the present invention is to provide power steering apparatus wherein a first steering shaft and a second steering shaft may be brought to be connected directly to each other without any intermediate members, when a certain amount of relative rotation takes place between a first steering shaft and a second steering shaft.

A still further object of the present invention is to provide power steering apparatus having a motor comprising axial plungers slidably mounted in a cylinder block in which each plunger is divided into two parts, and constant engagement between an inclined ring member and one of said two parts is assured by an aperture provided in said one of the two parts and spring means interposed between the two parts.

The foregoing and other objects of the invention, which will become more fully apparent from the following detailed description may be achieved by means of the representative apparatus set forth in this specification and depicted in the accompanying drawings, in which:

Figure 1:
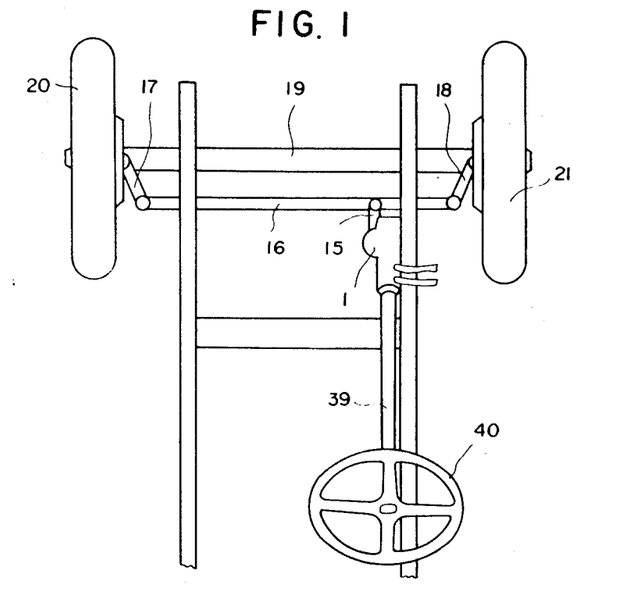
FIG. 1 is a partial perspective view of a vehicle to which the present invention is shown applied.
Figure 2:
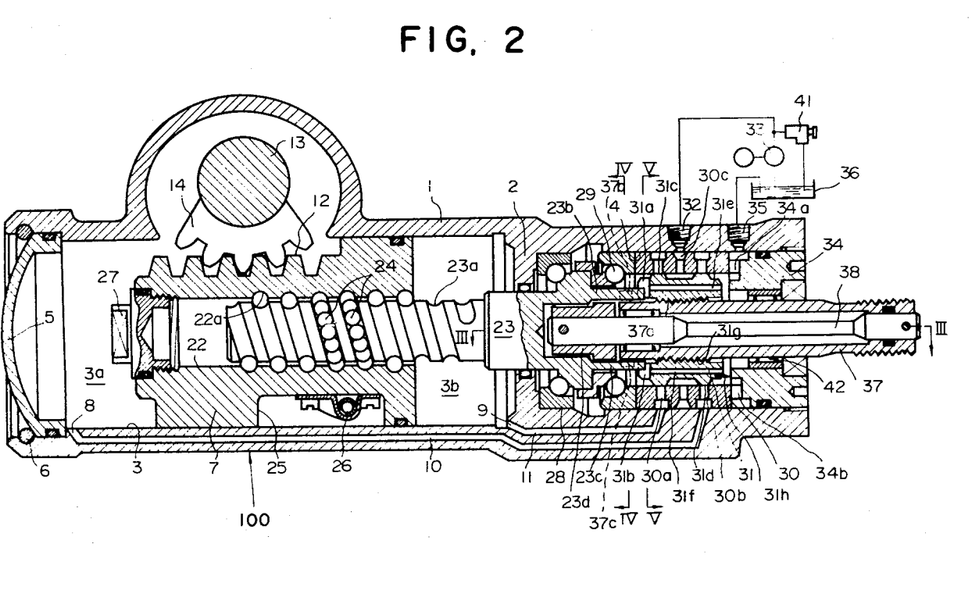
FIG. 2 is a longitudinal section through a first embodiment of the power steering apparatus according to the present invention.
Figure 3:
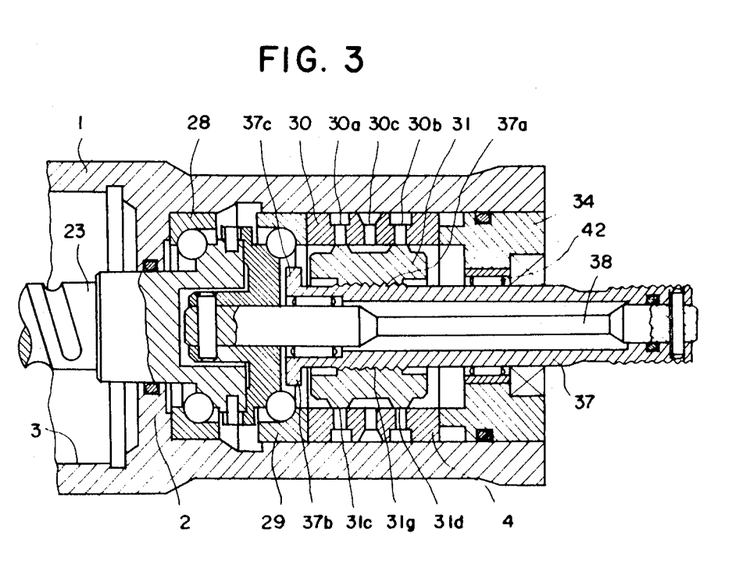
FIG. 3 is a sectional view through the servo valve means, taken along the line III—III of FIG. 2.

Referring now to FIGS. 2 and 3, reference numeral 1 indicates the main body of the power steering means, which is divided into two parts by a partition 2. One of these parts defines the chamber 3 of a reciprocating hydraulic motor 100, and the other constitutes the housing 4 of a servo valve. One end of the chamber 3 is hermetically sealed by a cylinder cover 5 and a stationary ring 6. Slidably mounted in the chamber 3 is a piston 7 which forms a left hand chamber 3a and right hand chamber 3b therein. Ports 8 and 9 to introduce pressure fluid respectively into the left hand chamber 3a and the right hand chamber 3b open into the hydraulic cylinder 3. These ports 8 and 9 communicate via the fluid conduits 10 and 11 in the main body 1 with a servo valve to be described later. On the periphery of the piston 7 is a rack 12, which meshes with a sector gear 14 secured to one end of a gear shaft 13. The gear shaft 13 is journaled in the main body 1, the axis of the shaft 13 being at a right angle to the axis of the piston 7. The other end of the gear shaft 13 is connected to a pitman 15 (see FIG. 1). The pitman 15 is connected to a connecting rod 16 which is a member of a four part linkage.

The each opposite end of said connecting rod 16 is pivotally connected to each one end of the connecting arms 17 and 18, the other ends of the arms 17 and 18 attached to steering knuckles pivotally connected to the front axle 19. Thus, the steerable front wheels 20 and 21 rotatably mounted on the steering knuckles may be steered by steering torque transmitted through the four part linkage in a conventional manner.

The piston 7 is provided with an axial bore 22. A helical worm groove 22a having a semi-circular cross section is provided on the cylindrical surface defining the bore 22. Another helical worm groove 23a complementary to the groove 22a is provided on the cylindrical surface of a worm shaft 23 mounted in the bore 22. A train of balls 24 for interconnecting the piston 7 and the shaft 23 without any substantial frictional resistance is seated in the helical race formed therebetween. A transfer tube 26 for receiving the balls 24 to keep them in circulation is mounted in a notch 25 intermediate the ends of the piston 7. One end of the bore 22 in the piston 7 is blocked by a plug 27.

Figure 5:
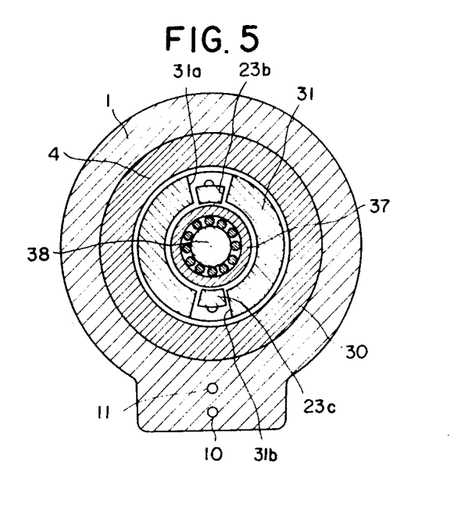
FIG. 5 is a sectional view taken along the line V—V of FIG. 2.

One end of the worm shaft 23 passes through the partition 2 and is rotatably mounted in the servo valve housing 4 by anti-friction bearings 28 and 29. A stationary main valve member 30 is mounted in the servo valve housing 4. A spool valve 31 is axially slidable and rotatable in the valve member 30, and can be axially displaced to distribute the pressure fluid to the left hand chamber 3a and the right hand chamber 3b respectively of the hydraulic cylinder 3. As shown in FIG. 5, two radial slots 31a and 31b are formed on the left end of the spool valve 31, and engage projections 23b and 23c extending from the right end of the worm shaft 23 in such manner that the spool valve 31 is constrained to rotate with the worm shaft 23, but is permitted to move axially with respect thereto. The spool valve 31 has two lands 31c and 31d spaced a predetermined distance from each other. The valve member 30 is provided with distribution ports 30a and 30b which are blocked by said lands 31c and 31d in the neutral position of the spool valve 31 as indicated in FIG. 2. The port 30a is connected to the fluid conduit 11 which communicates with the right hand chamber 3b, while the other hole 30b is connected to the fluid conduit 10 which communicates with the left chamber 3a. The valve member 30 has another port 30c located between the distribution ports 30a and 30b. This port 30c is connected through the inlet 32 in the servo valve housing 4 to the supply pump 33 from which pressure fluid is supplied. A support member 34 is screwed into one end of the servo valve housing 4. One end of the support member 34 is provided with grooves 34a and 34b for discharging the pressure fluid. These grooves lead through the outlet 35 of the servo valve housing 4 to a fluid reservoir 36. The discharged fluid is led to the outlet 35 through the axial guide holes 31e and 31f in the spool valve 31.

A steering shaft 37 is rotatably journaled in an antifriction bearing 42 in the support member 34. An external thread 37a is formed on the periphery of the steering shaft 37 adjacent to the left end thereof. An internal thread 31g complementary to the external thread 37a is formed on the inner bore of the spool valve 31 and engages the thread 37a. Between the steering shaft 37 and the worm shaft 23 is a concentric resilient torsion bar 38, one end of which is pinned to the steering shaft 37 and the other end of which is pinned to the coupling member 23d fixed to the worm shaft 23, thereby resiliently coupling the steering shaft 37 and the worm shaft 23. The coupling member 23d attached to the right end of the worm shaft 23 is provided to facilitate the assembling of the worm shaft 23 and the torsion bar 38.

Figure 4:
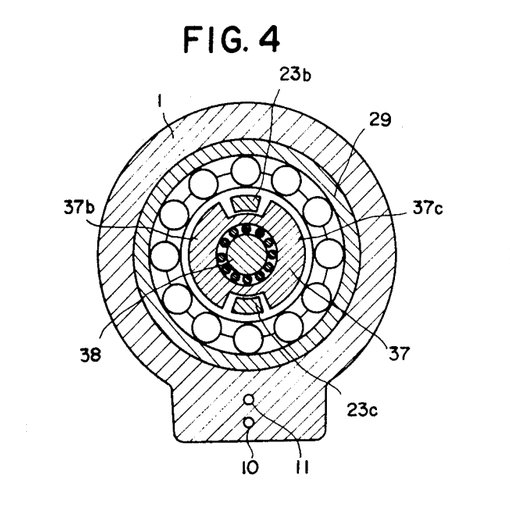
FIG. 4 is a sectional view taken along the line IV—IV of FIG. 2.

At one end of the steering shaft 37 are the parts 37b and 37c which loosely engage the projections 23b and 23c of the worm shaft 23. As indicated in FIG. 4, these parts 37b and 37c are formed to permit relative rotation between the steering shaft 37 and the worm shaft 23 within predetermined limits. Such relative rotation between the steering shaft 37 and the worm shaft 23 is caused by twisting of the torsion bar 38. The other end of the steering shaft 37 is connected, as shown in FIG. 1, by conventional means, to a steering column 39, one end of which is attached to the steering wheel 40 to be operated by the driver.

The operation of this power steering apparatus will now be described. When the supply pump 33 is actuated by driving means such as the engine of a vehicle, the pressure fluid reaches the spool valve 31 through the inlet 32 and the fluid port 30c, but since both distribution ports 30a and 30b are blocked by the lands 31c and 31d on the spool valve 31, the pressure fluid is discharged through the relief valve 41 to the fluid reservoir 36. Thus neither chamber of the hydraulic motor 100 is supplied with pressure fluid. If, now the steering wheel 40 is turned rightward, the steering shaft 37 is rotated in the same direction through the steering column 39, whereby the torsion bar 38 is twisted to cause relative rotation between the steering shaft 37 and the worm shaft 23, since the latter is not rotated due to the resistance transferred to the piston 7 from the steerable front wheels 20 and 21. As the result of the rotation of the steering shaft 37 relative to the worm shaft 23, the spool valve 31 which is threaded onto the steering shaft 37 and cannot rotate relative to the worm shaft 23 is displaced in an axial direction (for instance, in the direction of the arrow 31h). In consequence, the port 30b is brought into communication with the inlet 32 and the port 30a with the outlet 35 through the guide ports 31e and 31f. Accordingly, the pressure fluid which has entered through the inlet 32 can leave through the fluid port 30c, the distribution port 30b and the fluid conduit 10 into the left hand chamber 3a in the hydraulic motor 100 through the port 8, thereby causing the piston 7 to move to the right. At this instant the fluid in the right hand chamber 3b is discharged through the port 9, the fluid conduit 11, the distribution port 30a, the guide ports 31e and 31f, and the fluid discharge ports 34a and 34b, into the fluid reservoir 36. The axial movement of the piston 7 turns the sector gear 14 to swing the pitman arm 15 via the gear shaft 13. As the result, the connecting rod 16 moves and its movement is converted by the link mechanism into a deflection of the steerable front wheels 20 and 21. As the piston 7 moves to the right, the worm shaft 23 is rotated by the ball screw in the same direction as steering shaft 37, thereby displacing the spool valve 31 in an axial direction opposite to that of the arrow 31h. In this fashion, the small steering torque applied by the driver to the steering wheel 40 is boosted by the power of the hydraulic motor to overcome the resistance of the ground to deflection of the steerable front wheels 20 and 21.

When the steering wheel 40 is held in a turning position, the manual steering torque supplied by the driver and the power of the hydraulic pressure motor are balanced against the ground resistance to turning of the steerable front wheels, thus maintaining the steerable wheels 20 and 21 in deflected condition, and the driver can feel the steering reaction of the twisting torque on the torsion bar 38. If, in this position, the driver releases the steering wheel 40, the twisting torque accumulated in the torsion bar 38 and the recovering force due to the counter force from the front wheels or the ground resistance to the front wheels will cause the piston 7 to revert to its neutral position, rotating the worm shaft 23 and turning the steering wheel 40 in the reverse direction to resume the neutral position. The spool valve 31 then returns to its neutral position and the distribution ports 30a and 30b are again closed. When the steering wheel 40 is turned left, the spool valve 31 is displaced in the opposite direction to that of the arrow 31h, and one distribution port 30b is brought into communication with the outlet 35 and the other distribution port 30a with the inlet 32. In consequence, the pressure fluid passes through the port 9 via the distribution port 30a and the fluid conduit 11 into the right hand chamber 3b of the hydraulic motor 100 to cause the piston 7 to move to the left, thereby turning the steerable wheels 20 and 21 to the left by means of the sector gear 14, the gear shaft 13 and the pitman arm 15. As the angle through which the steering wheel 40 is turned increases, the force twisting the torsion bar 38 and the resistance of the ground to turning of the steerable front wheels steadily grows. Accordingly the driver can feel a steering reaction approximately proportional to the angle through which the steering wheel is turned, which will contribute to safe driving. When a certain amount of relative rotation has taken place between the steering shaft 37 and the worm shaft 23, the portions 37b and 37c come into engagement with the projections 23b and 23c, transmitting the steering torque applied to the steering shaft 37 directly to the worm shaft 23. Thus, since no more than a predetermined magnitude of twisting torque is applied to the torsion bar 38, it is well protected.

Neither the steering torque applied to the steering wheel 40 nor the reaction from the threaded shaft 23 is applied to the spool valve 31, which merely makes an axial motion caused by the relative rotation between the spool valve 31 and the steering shaft 37. An excessive, abrupt application of the steering torque results in direct coupling of the steering shaft 37 and the worm shaft 23, causing direct transmission of the torque, but even in that case, no torque acts on the spool valve 31. Therefore, the spool valve 31 can be designed primarily from the point of view of its accuracy as a valve, with few restrictions resulting from requirements as to strength or structure.

Figure 6:
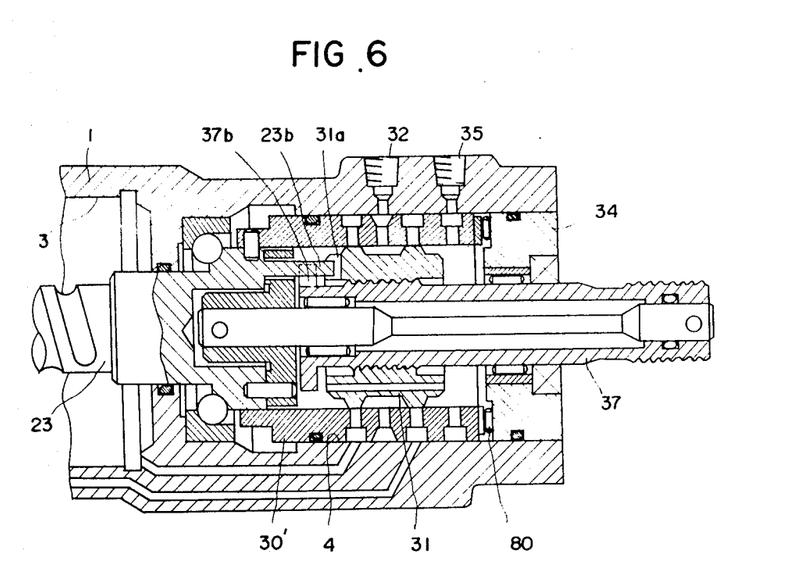
FIG. 6 is a longitudinal section through an alternative form of the servo valve means shown in FIG. 2.

FIG. 6 illustrates an alternative form of the servo valve means according to the present invention. Whereas the valve member 30 of FIG. 2 is stationary within the valve housing 4, the valve member 30' of FIG. 6 is rotatably mounted in the valve housing 4. In FIG. 6, the left end of the valve member 30' is fixed to the worm shaft 23 which is rotatably supported by the servo valve housing 4. The other end of the valve member is supported by the thrust bearing 80 between the support member 34 and the valve member. The worm shaft 23 is provided with a projection 23b similar to the one in the servo valve means of FIG. 2. The projection 23b engages the slot 31a in the spool valve 31 slidably mounted in the valve member 30' in such manner that it can move only in an axial direction in said valve member, and rotates therewith and also extends through the engaging part 37b of the steering shaft 37, in which it is permitted to rotate through a relatively restricted angle. As a consequence of this arrangement, the spool valve 31 is permitted to move only axially relative to the valve member 30' and no relative rotation can occur between them.

Figure 7:
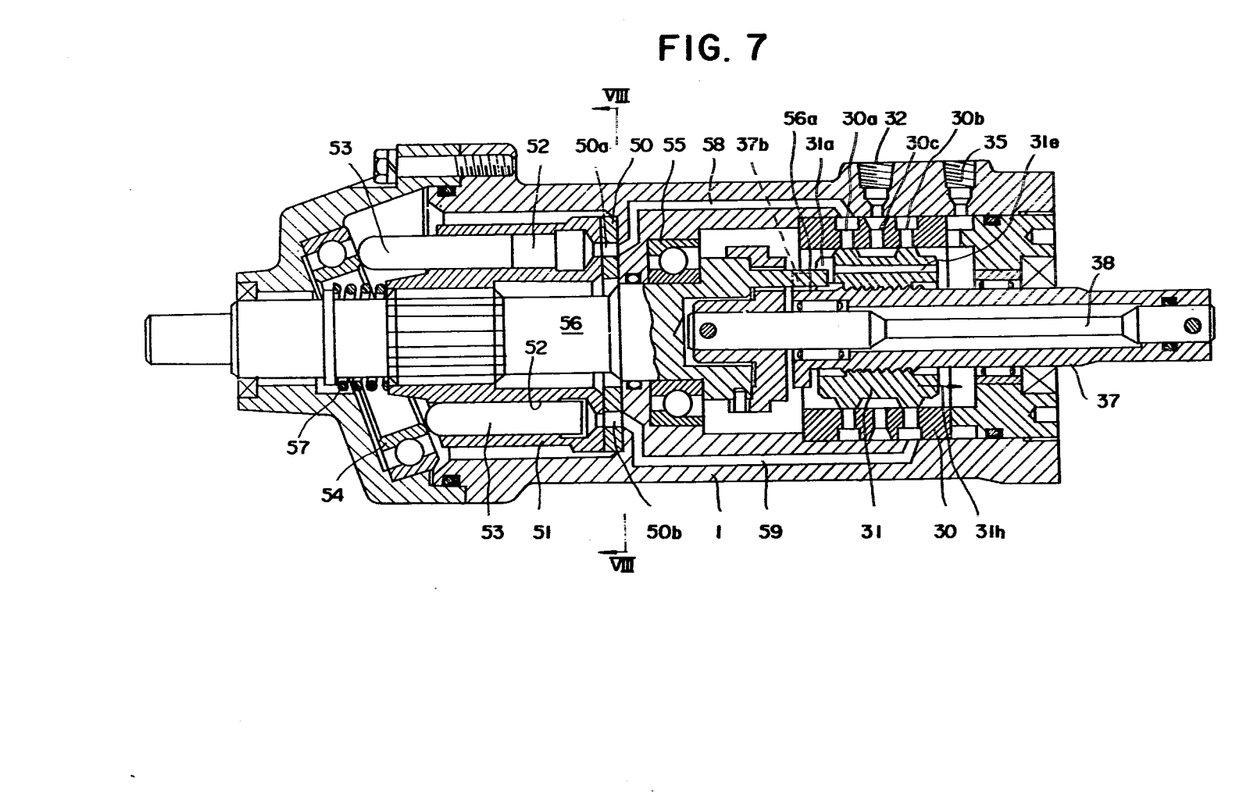
FIG. 7 is a longitudinal section through second embodiment of the power steering apparatus according to the present invention.
Figure 8:
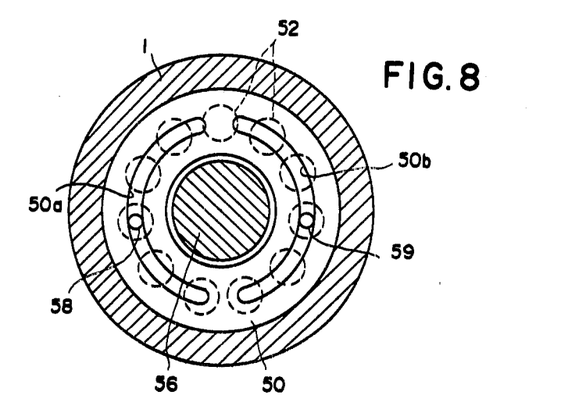
FIG. 8 is a sectional view taken along the line VIII—VIII of FIG. 7.

The second embodiment of the present invention is illustrated in FIGS. 7 and 8. The difference between this embodiment and the preceding one is that the axial displacement of the spool valve 31 by manual operation of the steering wheel 40 controls a rotary motor. In FIGS. 7 and 8, the valve mechanism is absolutely identical to the one in the one in the preceding embodiment, and the corresponding parts to FIGS. 1 and 2 are denoted by the same symbols. The motor comprises the stationary valve plate 50 pierced by two diametrically opposite arcuate ports 50a and 50b; the cylinder block 51 in abutment with the valve plate 50 and rotatable relatively thereto; an odd number of cylinder bores 52 equidistance from each other on the same circumference of the cylinder block 51; plungers 53 slidably carried in the cylinder bores 52; the rotatable inclined ring 54 subject to pressure by the plungers 53; the rotating output shaft 56 rotatably carried by the ball bearing 55 in the main body 1 of the power steering apparatus and splined to the cylinder block 51; and the spring 57 between an enlarged portion on the output shaft 56 and the cylinder block 51, which spring presses the cylinder block 51 against the valve plate 50. The output shaft 56 is coaxial with the steering shaft 37 and the right end of the output shaft 56 is provided with a projection 56a just like the projection on the worm shaft 23 in the preceding embodiment. The projection 56a engages the groove 31a in the spool valve 31 in such a way that it can move only in an axial direction, and also loosely engages the portion 37b of the steering shaft 37 so as to permit relative rotation therebetween within a restricted angular range. A resilient torsion bar 38 extends concentrically through the steering shaft 37 and is connected to the shafts 37 and 56 at the ends thereof so that the shafts 37 and 56 are resiliently connected with each other. The distribution ports 30a and 30b of the valve member 30 are respectively connected through the fluid conduits 58 and 59 to arcuate ports 50a and 50b in the valve plate 50.

Under the above arrangement, when the steering wheel 40 is turned to the right the steering shaft 37 is rotated through the steering column 39. The resistance of the ground to any turning of the steerable front wheels is transferred to the output shaft 56, and the torsion bar 38 is twisted to cause the rotation of the steering shaft 37 relative to the output shaft 56. Assuming that the spool valve 31 is displaced in the direction shown by the arrow 31h when the steering shaft 37 is turned relative to the output shaft 56, the distribution port 30b is brought into communication with the fluid port 30c. Thus, the pressure fluid, which has reached the main body 1 of the power steering apparatus through the inlet 32 from the supply pump, can be introduced through one arcuate port 50b in the valve plate 50 into the cylinder bores 52 corresponding to the port 50b, through the fluid port 30c, the distribution port 30b and the fluid conduit 59, and the pressure fluid pushes the plungers 53 to rotate the cylinder block 51. In the meantime, the fluid within the other cylinder bores 52 corresponding to the other arcuate port 50a flows from those bores through the fluid conduit 58, the distribution port 30a and the guide port 31e into the fluid reservoir. Rotation of the cylinder block 51 causes the output shaft 56 to rotate in the same direction as the steering shaft 37. The rotation of the output shaft 56 is converted by appropriate mechanism to a swinging motion of the pitman 15 of FIG. 1, the swinging motion causing a rightward deflection of the steerable wheels 20 and 21 through the link mechanism. In this way, the small steering torque applied by the driver to the steering wheel 40 is boosted by the power of the axial-plunger type motor. When the steering wheel 40 is turned to the left, the spool valve 31 is displaced in the opposite direction to that of the arrow 31h and the pressure fluid passes through the inlet 32, the distribution port 30a and the fluid conduit 58 from the arcuate port 50a in the valve plate 50 into the cylinder bores 52 corresponding to the arcuate port 50a, thereby causing the output shaft 56 to rotate in the opposite direction deflecting the steerable front wheels 20 and 21 to the left. In this arrangement in which the rotating output shaft adjacent to and concentric with the servo-valve is rotated by an axial-plunger type motor to boost the manual steering torque, the steerable wheels can be easily deflected and the torque is effectively transmitted. This arrangement is suitable for industrial vehicles which need strong steering power. The power steering apparatus of this arrangement may be compactly designed.

Figure 9:
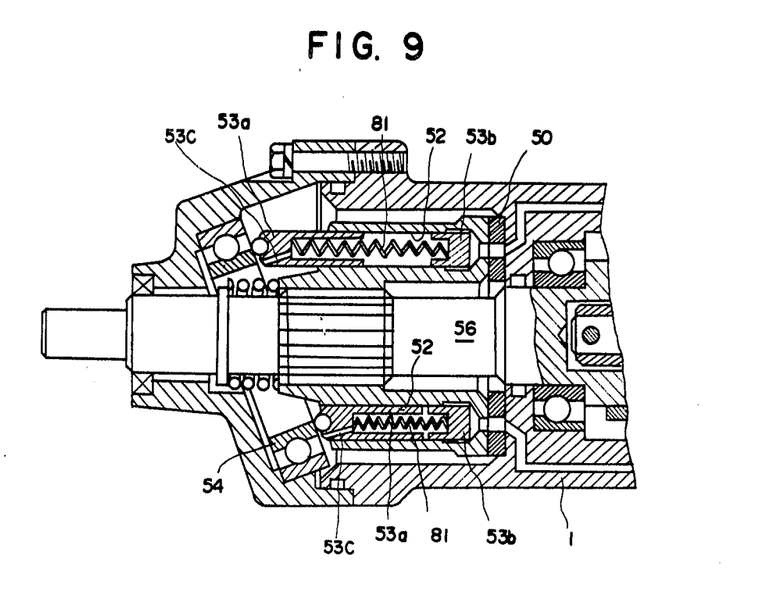
FIG. 9 is a longitudinal section taken through an alternative form of the hydraulic pressure motor shown in FIG. 7.

FIG. 9 illustrates an alternative form of the axial-plunger type motor of FIG. 7. In the embodiment of FIG. 7, relative rotation, between the steering shaft 37 and the rotating output shaft 56, due to the manual operation of the steering wheel 40 causes the pressure fluid to pass into appropriate cylinder bores 52, thereby urging the plungers 53 against the inclined ring 54 and rotating the rotating output shaft 56. During reverse rotation of the rotating output shaft 56 due to reverse of the deflection of the steerable front wheels 20 and 21 there is a likelihood that the tops of the plungers 53 in the cylinder bores 52 corresponding to the arcuate port which is brought to be communicated with the fluid reservoir may become disengaged from the inclined ring 54. If pressure fluid is then again supplied to the cylinder bores 52, the plungers 53 are axially moved and hit the inclined ring 54. To prevent this, as shown in FIG. 9, each of the plungers is split into two members 53a and 53b; and between said two members a spring 81 is inserted. An aperture 53c is provided at the left end of the member 53a to hydraulically connect the chamber in the cylinder bore 52 and a chamber outside the cylinder block 51. The force of the spring 81 will keep each plunger 53a pressed against the inclined ring 54 to maintain the engagement between the split plunger 53a and the inclined ring 54, since the fluid in the chamber outside the cylinder block 51 is not subject to any substantial pressure.

Figures 10, 11:
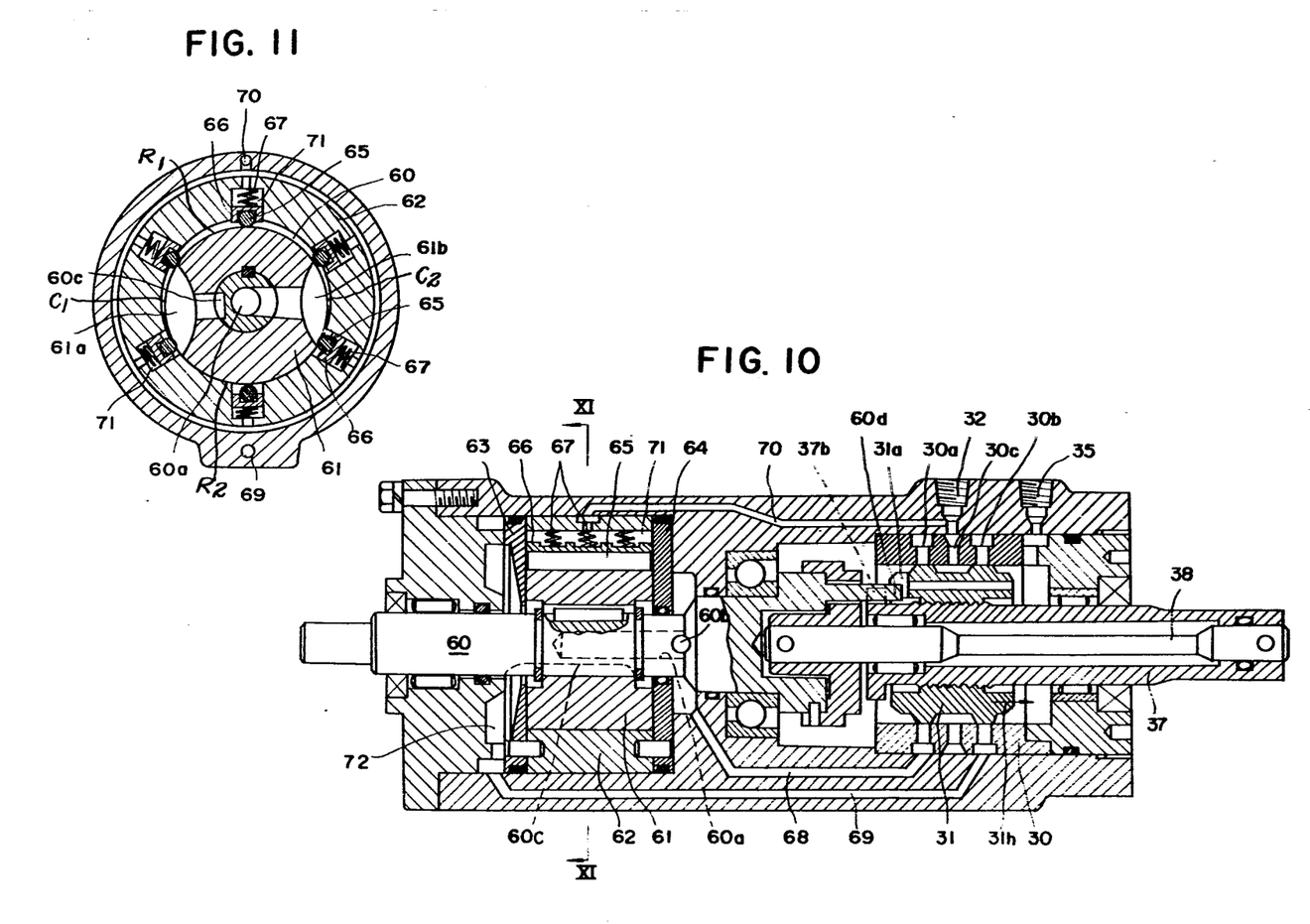
FIG. 10 is a longitudinal section through a third embodiment of the power steering apparatus according to the present invention.
FIG. 11 is a sectional view taken along the line IX—IX of FIG. 10.

The third embodiment of this invention is illustrated in FIGS. 10 and 11. In this embodiment, a constant displacement rotary motor is controlled by the axial displacement of the spool valve 31 through the manual operation of the steering wheel 40. The motor comprises an output shaft 60 rotatably supported by the main body 1 on the same axis as the steering shaft 37; a rotor member 61 keyed to the output shaft 60 generally eccentric thereto to form a crescent-shaped chamber between a casing member 62 and the rotor member 61 (the cylindrical casing member 62 being mounted in the body 1 and surrounding the rotor member 61); disc plates 63 and 64 facing opposite ends of the casing member 62 (the inside surfaces of the disc plates being in slidable contact relative to the opposite ends of the rotor member); and cylindrical rods 65 rotatably supported by supporting members 66 and urged toward the outer periphery of the rotor member 61 by the force of spring means 67 and of fluid pressure applied in slots 71 which are equally spaced within the inner periphery of the casing member 62.

On the outer periphery of the rotor 61, are first and second concentric portions $R_1$ and $R_2$ diametrically opposite each other. The first concentric portion $R_1$ is part-circular having the center of the driving shaft 31 as its center and a radius which is smaller than that of the inner bore of the casing member 20. The second concentric portion $R_2$ is also part-circular, and has the same center, but has a radius which is almost the same as that of the inner bore of the casing member 20 so as to assure a sliding engagement therewith. The two intermediate portions are connected with first and second surfaces $C_1$ and $C_2$, whereby a crescent-shaped clearance is formed between the rotor 30 and the inner bore as above mentioned.

Two concave recesses 61a and 61b are formed on the central portions of the first and second surfaces $C_1$, $C_2$ intermediate the ends of the rotor 30. The recess 61b is connected to the distribution port 30a in the valve member 30 through the channel 60a which is concentrically formed in the output shaft, a pass port 60b bored to the channel 60a from the periphery of the output shaft 60, and a fluid conduit 68 bored in the main body 1 of the power steering apparatus. The other recess 61a is connected to the distribution port 30b through the longitudinal channel 60c formed on the periphery of the output shaft 60, a chamber 72 and a fluid conduit 69 provided in the main body 1.

The one recess 61b is connected to the distribution port 30a of the valve member 30 via the long port 60a and the pass port 60b inside the output shaft 60, and via the fluid conduit 68 in the main body 1 of the power steering apparatus; and the other recess 61a is connected to the distribution port 30b through channel 60c (which extends axially along the periphery of the output shaft 60), chamber 72, and fluid conduit 69 in the main body 1 of the power steering apparatus. A fluid conduit 70 connecting the inlet 32 and spring chamber 71 is also formed in the main body. Like the above-mentioned output shaft 56 of the axial plunger type motor, the output shaft 60 has on its right end a projection 60d, which engages the slot 31a in the spool valve 31 in such manner that it can move only in an axial direction, and also loosely engages the portion 37b of the steering shaft 37 so as to permit relative rotation therebetween within a restricted angular range. A resilient torsion bar extends concentrically through the steering shaft 37 and is connected at its ends to the shafts 37 and 60.

In this arrangement, when the steering wheel is turned to the right, it causes the torsion bar 38 to be twisted, inducing relative rotation between the steering shaft 37 and the output shaft 60. As a result, the spool valve 31 is displaced in the direction of the arrow 31h, bringing the distribution port 30b into communication with the fluid port 30c. The pressure fluid which is introduced through the inlet 32 then passes from the channel 60c in the output shaft 60 into the recess 61a in the rotor member 61 through the fluid port 30c, the distribution port 30b, the fluid conduit 69 and the chamber 72. Since the rotor member 61 is ecentrically mounted on the output shaft 60 to form a crescent-shaped chamber in the casing member, the rotor member 61 will be rotated in the same direction as the steering shaft 37 and turn the output shaft 60 with it when the fluid runs into the recess 61a of the rotor member 61. Rotation of this output shaft 60 causes (through appropriate gearing and link mechanism) a deflection of the steerable front wheels 20 and 21. Next, when the steering wheel 40 is turned to the left, relative rotation between the steering shaft 37 and the output shaft 60 causes displacement of the spool valve 31 in a direction opposite to that shown by the arrow 31h, and as a result the fluid passes through the distribution port 30a into the recess 61b through the fluid conduit 68, the port 60b and a long port 60a, thereby rotating the output shaft 60 in a direction opposite to the one previously described and deflecting the steerable wheels 20 and 21. This arrangement has the advantage of not only producing a strong steering torque by means of an eccentric type motor, but also making the power steering apparatus quite small.

As described above in detail, the present invention represents power steering apparatus so arranged that on the same axis as the steering shaft the output shaft of an axial-plunger type motor or a constant displacement rotary motor or other motor, or the worm shaft engaging the piston of a hydraulic reciprocating motor, is movably positioned. A rotating shaft such as the output shaft or the worm shaft is connected with the steering shaft by means of a resilient coupling. A spool valve movable axially of the valve member is screwed onto the steering shaft. The spool valve engages the rotating shaft in a manner such that it can slide in an axial direction only, and the steering shaft is in close mechanical engagement with the worm or output shaft. In this arrangement, relative rotation between the steering shaft and the output or worm shaft takes place as the result of the steering wheel being manually operated; and this relative rotation of the two shafts displaces the spool valve which is screwed onto with the steering shaft and permitted to move only axially relative to the rotating shaft, thereby distributing the pressure fluid to a hydraulic motor such as a reciprocating motor, a plunger type motor or a constant displacement rotary motor; and the power of this hydraulic pressure motor boosts the manual steering torque to reduce the force which the drive must exert on the steering wheel.

The present invention is not restricted to the details of the several embodiments disclosed herein; since various modifications can easily be made by a man skilled in the art without departing from the basic concepts defined by the following claims.

What is claimed is:

1. In a vehicle having a steering wheel and steerable road-engaging wheels, the improved power steering apparatus which comprises:

a steering shaft adapted to be coupled to said steering wheel;

a spool valve encircling said steering shaft member;

a stationary valve sleeve encircling and slidably engaged by said spool valve and defining a plurality of fluid ports;

a rotatable shaft positioned coaxially of said steering shaft member and connected to guide the steerable road-engaging wheels of said vehicle;

elongated means resiliently coupling one end of said rotatable shaft member and one end of said steering shaft member together;

a hydraulic motor powered by fluid flowing through said ports and connected to rotate said rotatable shaft; and motion transmitting means between said rotatable shaft and said steering shaft and spool valve which causes said spool valve to move axially relative to said stationary sleeve when said steering shaft is turned relative to said rotatable shaft, thereby opening one of said fluid ports to supply pressure fluid to said hydraulic motor, but restricts said steering shaft to rotation through a restricted angle relative to said rotatable shaft;

said motion transmitting means having relatively movable inter-engaging surfaces located nearer to the end of said elongated means which is coupled to said rotating shaft than to the opposite end of said elongated means.

2. Power steering apparatus as claimed in cliam 1, in which said hydraulic motor is a reciprocating piston motor.

3. Power steering apparatus as claimed in claim 1, wherein said hydraulic motor comprises a rotary output member driven by axially movable plungers, said plungers being actuated by pressure fluid supplied through said ports.

4. Power steering apparatus as claimed in claim 3, wherein said plungers are divided into two parts separated by a spring.

5. Power steering apparatus as claimed in claim 2 in which said sleeve defines axially spaced ports communicating with opposite sides of said piston, and movement of said spool valve in one axial direction opens one of said ports, while movement in the other direction opens the other of said ports.

6. Power steering apparatus as claimed in claim 2 in which said piston is rotatably mounted on said rotating shaft and frictionally driven by said rotatable shaft.

References Cited

UNITED STATES PATENTS

| 3,218,937 | 11/1965 | Dettlof | 91—368 |
| 3,292,499 | 12/1966 | Duffy | 91—368 |

PAUL E. MASLOUSKY, Primary Examiner

U.S. Cl. X.R.

91—368